United States Patent [19]

Van Ommering et al.

[11] 4,115,630
[45] Sep. 19, 1978

[54] METAL-HYDROGEN BATTERY

[75] Inventors: Gerrit Van Ommering, Chevy Chase; Joseph F. Stockel, Rockville; James D. Dunlop, Gaithersburg, all of Md.

[73] Assignee: Communications Satellite Corporation, Washington, D.C.

[21] Appl. No.: 778,821

[22] Filed: Mar. 17, 1977

[51] Int. Cl.² ........................................... H01M 12/06
[52] U.S. Cl. ..................................... 429/72; 429/101
[58] Field of Search ................... 429/101, 72, 59, 21, 429/29, 223, 42, 45

[56] References Cited

U.S. PATENT DOCUMENTS

| | | | |
|---|---|---|---|
| 3,119,722 | 1/1964 | Tietze et al. | 429/59 |
| 3,193,412 | 7/1965 | Salkind et al. | 429/59 |
| 3,669,744 | 6/1972 | Tsenter et al. | 429/101 |
| 3,739,573 | 6/1973 | Giner | 429/29 |

Primary Examiner—Anthony Skapars
Attorney, Agent, or Firm—Sughrue, Rothwell, Mion, Zinn and Macpeak

[57] ABSTRACT

A rechargeable metal oxide-hydrogen battery which operates on the back-to-back electrode placement theory as opposed to single metal oxide-hydrogen couple cells is disclosed. Interconnecting of electrodes in series and construction of an electrode stack of series connected electrodes is utilized in one embodiment in place of bipolar construction to achieve high voltage operation. In a second embodiment, back-to-back construction is used for positive electrodes in a parallel arrangement of electrode connection to complete an operative cell. Individual cells are separated by a nonporous polymer separator which avoids the formation of electrolyte films which tend to electrochemically short each cell, yet are fashioned of light weight and volume to keep sizes to minimum dimensions. Interconnection of various cells is by means of bus bars coupled to electrode tabs. The entire stack of cells is held under compression by end plates and one or more tie rods, or, in the case of prismatic cell design, the stack can be held under compression by the walls of the battery container.

22 Claims, 6 Drawing Figures

METAL-HYDROGEN BATTERY

BACKGROUND OF THE INVENTION

1. Field of the Invention

This invention relates to metal oxide-hydrogen batteries.

2. Prior Art

Within the prior art, a variety of techniques and materials are utilized for assembling metal oxide-hydrogen cells to form operative batteries. The commonly used method of connecting electrodes in series is termed to be the bipolar connection method, and the basic feature of that system is that the positive electrode of a single cell and the negative electrode of the adjacent single cell are combined in one structure. This structure has as its function the electrical connection of the two electrodes and the separation of the electrolytes in adjacent cells. It is often utilized to separate the positive and negative electrode reactants in situations where they are not contained in the electrodes themselves. This prior art metal oxide-hydrogen battery of bipolar construction is shown schematically in FIG. 1. The stack 10 in FIG. 1 generally comprises a negative electrode 12, a positive electrode 14 and metal screen 16 separating the two electrodes. Individual electrodes are separated by means of a separator element 18. It should be noted that in this prior art construction, the positive and negative electrodes of adjacent cells are connected electrically by the metal screen 16, and the screen must also separate the electrolytes from different cells. In the prior art, a screen must be utilized instead of a solid plate so that gas has access to the hydrogen electrode (negative). This conventional design has several disadvantages.

First, the possibility of electrolyte contact between two cells still exists. In situations where long cell lifetimes are required, the danger that some electrolyte will be trapped in the screen thereby electrochemically shorting the cells becomes a major design consideration. Within the prior art, the use of a thick screen has been proposed to reduce the likelihood of such an occurrence, but at the expense of weight and volume in the cell increasing. Also, it is readily apparent that the use of heavier or thick screens increases the electrical resistance of that element. Another disadvantage with the prior art technique is that the metal electrode (positive) is discharged unevenly, that is, only from one side. This uneven discharge rate can lead to differential stresses between sides of the electrode which may result in buckling. In areas of high pressure where current density becomes extremely high, this buckling can lead to electrical shorting or cause high temperatures which would destroy the separator 18.

Additionally, prior art cells, as typified by FIG. 1, exhibit relatively high weights because one metal screen is used per metal oxide electrode, and, additionally, the screens themselves are relatively heavy. This high weight of the screen results from the thickness required to function as a separator and, additionally, from the small spacing of the mesh wires necessary to provide adequate support of the electrodes. Finally, because an adequate rate of heat rejection is necessary, the diameter of the prior art metal oxide-hydrogen cell stack cannot be made arbitrarily large. The total battery voltage, usually a fixed design factor, determines the number of plates used which combine with the maximum plate diameter, then determines the maximum energy content of the cell. Accordingly, making cells with large energy content is difficult utilizing bipolar construction techniques.

Also, within the prior art a variety of variations of the basic system denoted in FIG. 1 is known. For example, the patent to Tsenter et al., U.S. Pat. No. 3,669,744, shows in general configuration a hemispherically sealed nickel-hydrogen storage cell wherein a hemispherically sealed storage cell consisting of a nickel oxide electrode 1 and a negative hydrogen electrode 2 is disposed in a tank 3, each of the electrodes separated by a separator in vertical alignment. This patent emphasizes the problems of generating sufficient power vis-a-vis gas pressure requirements by an optimization of thickness ratios of the positive and negative electrode. Also, U.S. Pat. No. 3,716,413, Eisner, discloses a cell arrangement utilizing a center shaft 17 disposed on a cell case 10 to which electroes 11 and 13 are concentrically mounted. A series of bus bars 12 and 14 are also shown in Eisner in a parallel arrangment with the center shaft. The center shaft 17 broadly serves as a means of orientation of the electrodes within the cell.

As an alternative to the Eisner system, various other patents, such as U.S. Pat. Nos.: Niedrach, 3,297,484; Geltling, 3,436,272; Rohr, 3,505,114; Titterington, 3,607,215; and Louis et al., 3,833,424, all disclose fuel cell arrangements wherein electrode stacks are joined by a sequence of threaded bolts disposed along the periphery of a cell stack. Typical of this group is the patent to Louis et al in which a series of bolts 20 are disposed in clamping boards 26 to 29. Similarly, Niedrach discloses a series of bolts 19 utilizing spacers 20 with end plates 10 and 14 as the means of clamping the electrode structure together.

Additionally, the prior art is replete with numerous patents dealing with other techniques of construction of cell subcomponents. For example, patents to Giner, U.S. Pat. No. 3,739,573, and Dennison, U.S. Pat. No. 3,834,944, disclose cylindrical fuel cells which may be stacked and electrically connected in series. The Giner patent is of interest in that it discloses the use of a palladium foil with a palladium black surface saturated with hydrogen as one electrode composition and a separator of an electrolyte matrix in the form of asbestos soaked with a selected electrolyte. Additionally, patents to Gray, U.S. Pat. No. 3,617,385, and Winsel, U.S. Pat. No. 3,660,166, disclose vertical fuel cell arrays which are connected in series.

More recently, the technique of back-to-back electrode stacking has been evaluated. The inventors first discussed this generalized technique in the "Proceedings of the 9th International Symposium," Brighton, England, 1974, published in POWER SOURCES 5, 1975 (Academic Press). Although conceptualized, no definitive cell or battery structures were contemplated by that scientific teaching. The inventors have built upon those concepts to achieve complete, operative structures.

SUMMARY OF THE INVENTION

Given the implicit difficulties within the prior art, it is an object of this invention to provide for a high voltage metal-hydrogen battery utilizing a double metal electrode by series connection of the electrodes.

It is another object of this invention to provide for a metal-hydrogen battery in which the double metal electrode is discharged from both sides, thereby reducing stresses in the electrode stack.

Yet another object of this invention is to provide for a high voltage metal-hydrogen battery in which the double metal electrode reduces the likelihood of formation of shorts due to buckling of electrodes as a result of stress reduction in the cell stack.

A still further object of this invention is to provide for a system in a high voltage metal-hydrogen battery in which electrolyte contact between adjacent electrode couples is eliminated by means of a hydrophobic material cell separator.

Still another object of this invention is to provide for a gas diffusion screen which is therein, to reduce weight and volume of the battery.

A further object of this invention is to provide for a nickel-hydrogen cell using advanced technology in the fabrication and assembly by parallel interconnection of electrode elements.

Another object of this invention is to define those aspects of nickel-hydrogen cell technology needed in the design, fabrication and assembly of a complete operative unit.

These and other objects of this invention are achieved in a module using a back-to-back arrangement of metal oxide electrodes and nonporous polymer cell separators. In a first embodiment, two back-to-back metal oxide-hydrogen electrodes are sandwiched by two electrode separators containing electrolyte and two hydrogen electrodes, thus forming a single module. The modules are stacked together, insulated and separated by module separators, and the interconnection of electrodes involves welding or electrically connected by other means tabs of the metal oxide electrodes of the first module to the tabs of the hydrogen electrodes of the second module, and the metal oxide electrode tabs from the second module to the hydrogen electrode tabs of the third module, and so on until all modules have been connected. The tabs of the metal oxide electrode from the first module and the negative electrode tabs from the last module are then connected to the battery terminals. This back-to-back electrode series connection produces a high voltage battery. The entire stack of modules is held under compression by two end plates and one centrally disposed tie rod. As an alternative, in the case of prismatic cell design, the stack can be held under compression by the walls of the battery container.

In a second embodiment a nickel-hydrogen cell is constructed using back-to-back parallel connections. Utilizing pressure vessel technology, this invention contemplates the use of advanced technology in the design, development and fabrication of the vessel, electrode stack components, assembly and activation. Operative cells may then be electrically coupled to define an operative power source.

These and other objects of this invention will be apparent from the following description taken in connection with the accompanying drawings, in which:

DESCRIPTION OF THE PREFERRED EMBODIMENTS

Figure 1:
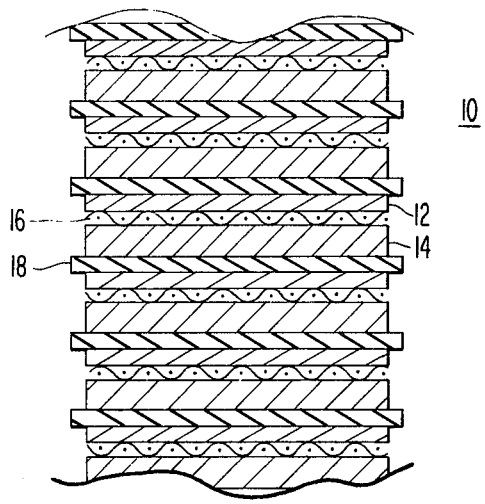
FIG. 1 is a schematic side view of a typical prior art cell stack construction.
Figure 2:
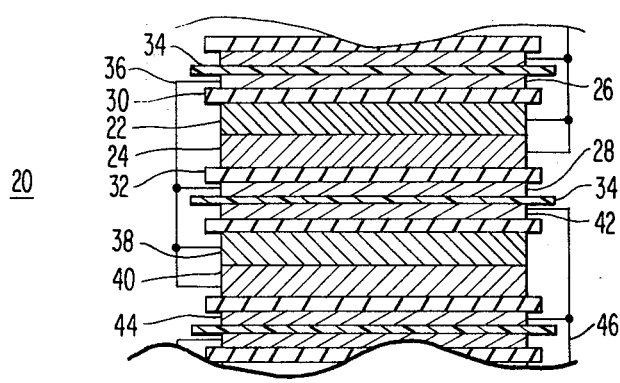
FIG. 2 is a schematic side view of a first embodiment showing a portion of the module configuration in applicants' novel metal oxide-hydrogen battery using series construction.

Turning now to FIG. 2, a first preferred embodiment will be discussed. A schematic side view of a section of applicants' novel high voltage metal oxide-hydrogen battery is shown using series interconnection. The stack 20, shown in FIG. 2, comprises a series of modules, each made of positive plates 22, 24 disposed in a back-to-back arrangement and negative plates 26, 28 separated from the back-to-back positive plates by means of separators 30, 32. A series of module separators 34 are utilized to separate individual modules of the stack. Shown schematically in FIG. 2 is the attachment of electrodes in each module to achieve a series construction. As shown in FIG. 2, the connection of negative electrodes 26 and 28 is effectuated by means of interconnector 36 and then in a series arrangement to back-to-back positive electrodes 38, 40 in a second module. The negative electrodes 42, 44 of the second module are coupled by means of connector 46 to the positive electrodes of the succeeding module.

The back-to-back positive electrodes 22 and 24 are typically fashioned of an aerospace type of sintered nickel, approximately 0.76 mm in thickness with loadings of approximately 0.105 ampere-hours/g, or 0.345 ampere-hours/cm$^3$. From optimization studies, it is known that energy density is dependent on ampere-hour capacity per unit area. With this electrode, the current density is approximately 11 mA/cm$^2$ for a complete discharge in approximately 2.0 hours. If it is desirable to operate at higher current densities, thicker positive electrodes must be utilized. Typically, electrodes in the order of 0.94 mm in thickness utilizing back-to-back current density design yield current densities of approximately 27 mA/cm$^2$ for a 2.0 hour discharge.

Alternatively, electro-chemically impregnated electrodes can be used in the construction of a 35 Ahr cell. Generally, these electrodes utilize a nickel screen for plaque support. Sintered nickel is used in the plaque, porosity is in the range of 78–85%. The loading level is 1 to 2 grams of active material per cm$^3$ void volume in the plaque. As shown in FIG. 2, two interconnector branches of lead 36 are utilized to couple the back-to-back electrodes, however, in practice to minimize the number of tabs one tab may be used in operative displacement between each pair of positive electrodes.

In terms of determining criteria for positive cell cross-sectional areas, optimization studies indicate that values of prime parameters for a 60-Whr battery are:
 (1) current density-45 mA/cm$^2$
 (2) pressure-7-35 atms
 (3) number of modules — 45.
Such a battery would have an energy density of approximately 88 Whr/kg with a diameter of 6.35 cm and an overall length of approximately 30 cm. The large number of modules increases the chance of edge shorting of electrodes and constructional problems of such a large battery may arise. Additionally, the relatively small diameter of each module creates a number of construction problems. Accordingly, consideration is given to reducing the number of modules, yet increasing the diameter of each module with diameter and current density remaining the major parameters, keeping the pressure range constant. As a result of such a variation, a revised battery decreases by approximately 2 Whr/kg in energy density by increasing diameter from 6.35 cm to 8.9 cm, while the number of modules is reduced in half. The value of 8.9 cm is therefore deemed to be a good compromise considering energy density and reliability.

Materials for separators 30 and 32 are either fuel cell grade asbestos or potassium titanate. These materials, as utilized in the nickel-hydrogen cell, are flooded with 30% by weight with potassium hydroxide electrolyte. Since the bubble through pressure differential for oxygen is approximately 5 psi, during overcharge the oxygen gas generated at the positive electrode escapes into the battery's free volume through the porous sinter structure of the positive electrode in preference to bubbling through the electrolyte in the electrode separator to the negative electrode. Oxygen is then recombined with hydrogen gas at the negative electrode to form water. This reaction is preferable to the oxygen gas bubbling through or leaking across the separator and rapidly reacting at the hydrogen electrode locally in the presence of the noble metal platinum black catalyst. For example, such a reaction can occur when utilizing a porous non-woven, nylon separator creating hot spots which are damaging to the battery. Another advantage of the fuel cell asbestos or potassium titanate separator material is its capability to retain the electrolyte within its pore structure.

The separators are generally 5–20 mil thick and are oversized in their dimensions in terms of diameter to overlap the electrodes. The center hole of the separators 30 and 32 when used in a cylindrical stack construction (see FIG. 4) is undersized. This variation in sizing is to avoid shorting between adjacent positive and negative electrodes around the edges or at the center hole, if such a center hole is provided.

The negative electrodes 26, 28 comprise generally a teflon bonded platinum black supported within a thin, fine-mesh, nickel screen. Typically, these negative electrodes are approximately 8 mils thick with a teflon hydrophobic surface on the backside next to the gas diffusion screen. It is imperative that the negative electrode have such a teflon backing to avoid the loss of electrolyte due to entrainment of the electrolyte in the hydrogen gas produced at the negative electrode during charging. Such electrodes are well known within the art. Noble metal loading is 3 mg/cm$^2$ of platinum black. This platinum loading is sufficient as a catalyst to operate the electrode at current densities of greater than 100 mA/cm$^2$ with very low polarization losses. Three mil nickel tabs are individually spot-welded onto the negative electrode. Although not shown in this embodiment, these tabs from the negative electrodes on either side of the gas diffusion screen are spot-welded together for connection to a bus bar.

The module separators 34 may be fashioned of a polymer, preferably hydrophobic in nature, such as polytetrafluorethylene, polyethylene, polypropylene and the like. The use of these materials will prevent electronic conduction between the two hydrogen electrodes which are at different potentials. Additionally, such separators should be nonporous in a direction perpendicular to the electrode face, thereby preventing electrolyte contact between adjacent cells. Each module separator may have a gas transport layer across each phase so as to provide gas access to the surfaces of the hydrogen electrodes. Such a gas transport layer can take many forms, such as utilization of a large number of scratches or grooves on each surface, or to utilize an extremely thin plastic sheet and on each face apply a metal or plastic screen.

Figure 4:
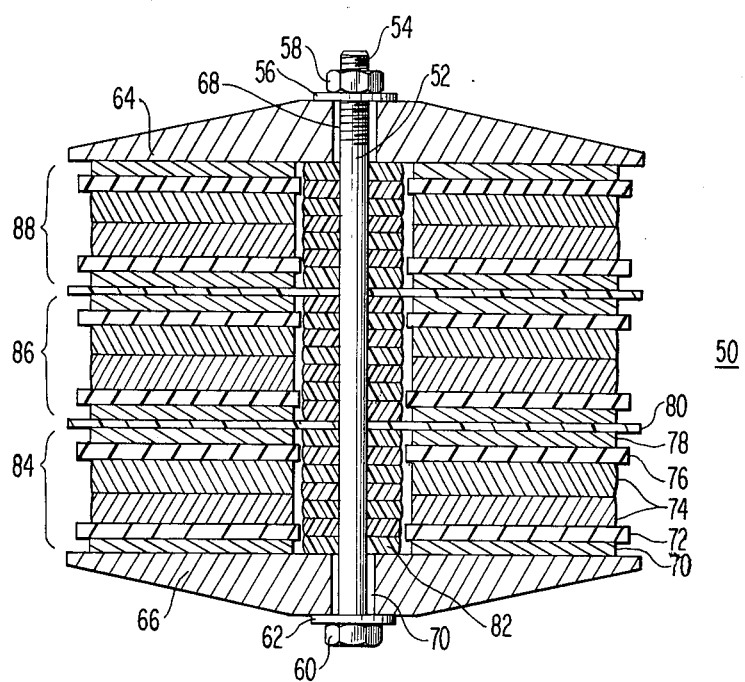
FIG. 4 is a schematic side view of a completed high voltage battery in the first embodiment showing compression plates and cell disposition around a centrally disposed axial tie rod.

Turning now to FIG. 4, a complete battery using back-to-back construction in a series arrangement is shown. This is the first embodiment in the use of back-to-back construction to form a high voltage battery. In FIG. 4, a schematic side view of a completed battery without showing the enclosed pressure vessel or the electrical connections as per FIG. 2 is depicted. Such a battery is cylindrical with the electrodes perpendicular to the central axis of the battery. In general, these designs have shown excellent thermal behavior. In particular, the heat generated in the electrode stack is conducted to the stack surface. From this point it passes through the hydrogen gas within the vessel to the pressure vessel wall where it may be then radiated and conducted away. In such an environment, a path of relatively low thermal resistance is obtained because conduction in a path direction parallel to the plates is rapid, and hydrogen gas is a good heat conductor. In contrast, prior art devices utilizing flat cells, such as in the Tsenter et al. patent, U.S. Pat. No. 3,669,744, require that heat must be conducted in a direction generally perpendicular to the plates and then through the pressure vessel wall; and, additionally, through a shim to a base plate of the battery package. Heat conductivity in a direction perpendicular to the plates is a factor of 10–20 smaller than parallel to the plates. For these reasons, additional modifications are required in flat electrode designs to improve heat conduction which generally result in increased weight. In environments of spacecraft batteries, this weight penalty becomes an unacceptable tradeoff.

As shown in FIG. 4, the battery 50 is generally axially disposed on a central rod 52 of 316 stainless steel having threads 54 at one end to receive a suitable washer 56 and lock nut arrangement 58. The bottom end of the central rod 52 may have a suitable bolt arrangement 60 with compatible washer 62 or, alternatively, may be threaded in a manner consistent with the upper end. Two compression plates, an upper plate 64 and a lower plate 66, are utilized to maintain the stack in its proper orientation. The upper compression plate has a centrally disposed bore 68 to receive the tie rod 52, and the lower compression plate 66 has a similarly disposed axial bore 70. The compression plates 64 and 66 may be fashioned of an inert material, such as polypropylene, polysulfone, by compression molding or the like.

If the material is to be compression molded, the following procedure can be used. Essentially, the molding process involves spraying the mold with the mold release product and then placing approximately 21 grams of the plastic material to be utilized into the mold. The inventors have generally found that loadings to 8,000 lbs. for 30 seconds, are a first phase in the process. Subsequently, the pressure is reduced to 3,500 lbs. and the heaters are activated to 375° F. As the temperature in the mold reaches 370° F., the load is increased back to 8,000 lbs. for 30 seconds. The load is then reduced to 3,500 lbs. and cooled to room temperature. Finally, these end plates are removed from the mold once cooling has been achieved.

The electrode stack is fabricated by building to the desired electrical capacity by placing components over the central rod 52. As shown in FIG. 4, the first electrode is the hydrogen electrode 70 followed by a separator 72 and two positive electrodes 74. A second separator 76 is then placed over the stack, identical to separator 72, and a second negative, or hydrogen, electrode 78 is then positioned. A first cell separator 80 is then disposed on the stack to complete one individual module. As shown in FIG. 4, each stack element has a bore larger than that of the center rod 52. To isolate rod 52 from the active elements of the battery, a succession of washers 82 are disposed around rod 52 such that the total height of the stack of washers 82 is equal to or nearly equal to that of the distance between module separators 80.

Upon compression of the device, the washers 82 will then compress slightly to seal the center rod 52, as well as the individual module separators 80. The washers 82 can be fashioned from the same material as the module separator 80, and as shown in FIG. 4, the height of this stack of washers 82 is equal to that of the active element in each individual module. Utilizing this fabrication technique, a succession of modules can be built up to form an operative battery. FIG. 4 depicts three distinct modules 84, 86 and 88. Upon completion of the stack, the top compression plate 64 is placed over the center rod and the locking mechanism 56 and 58 is then positioned. Once the unit is assembled, slotted bus bars can be installed to provide the electrical contact in the manner shown in FIG. 2 by resistance welding of electrode tabs (not shown) on each electrode to the bus bar tabs. Once this electrical connection has been completed, the bus bars themselves can be welded to feed-throughs in the battery casing.

Figure 3:
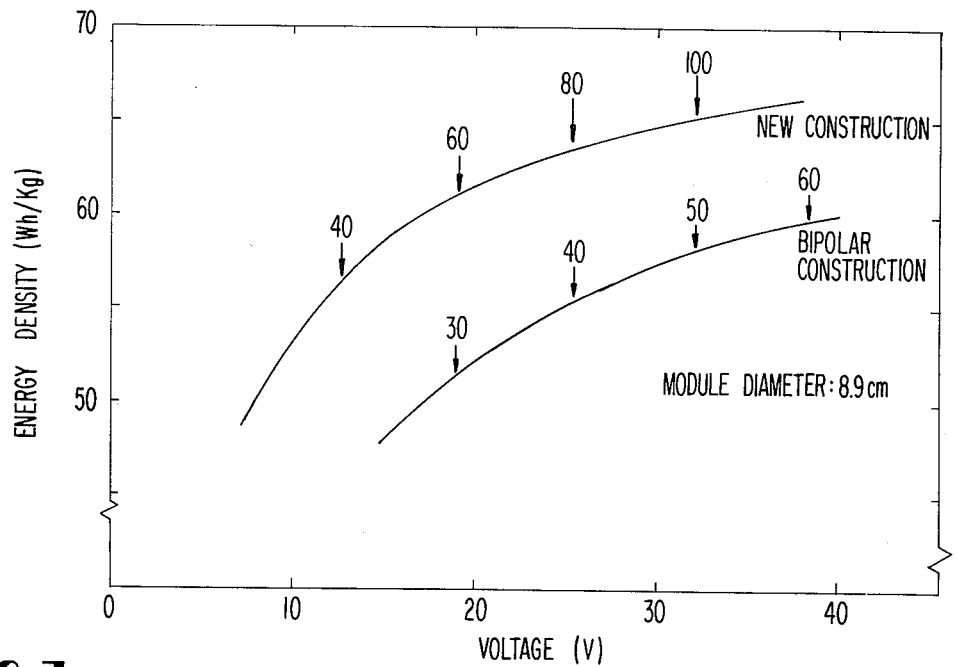
FIG. 3 is a graph of energy density v. cell voltage showing differences between bipolar construction and applicants' invention.

Referring now to FIG. 3, a graph of voltage v. energy density is depicted. In this graph, a comparison of two batteries, both with a module diameter of 8.9 cm, is shown. the lower trace indicates a conventional bipolar construction, and the upper trace shows a battery fashioned utilizing applicants' back-to-back series construction techniques. The numbers following each trace indicate the number of plates in each stack, and, as can plainly be shown and demonstrated by the plot in FIG. 3, the new construction yields materially higher energy densities for particular voltages.

Figures 5, 6:
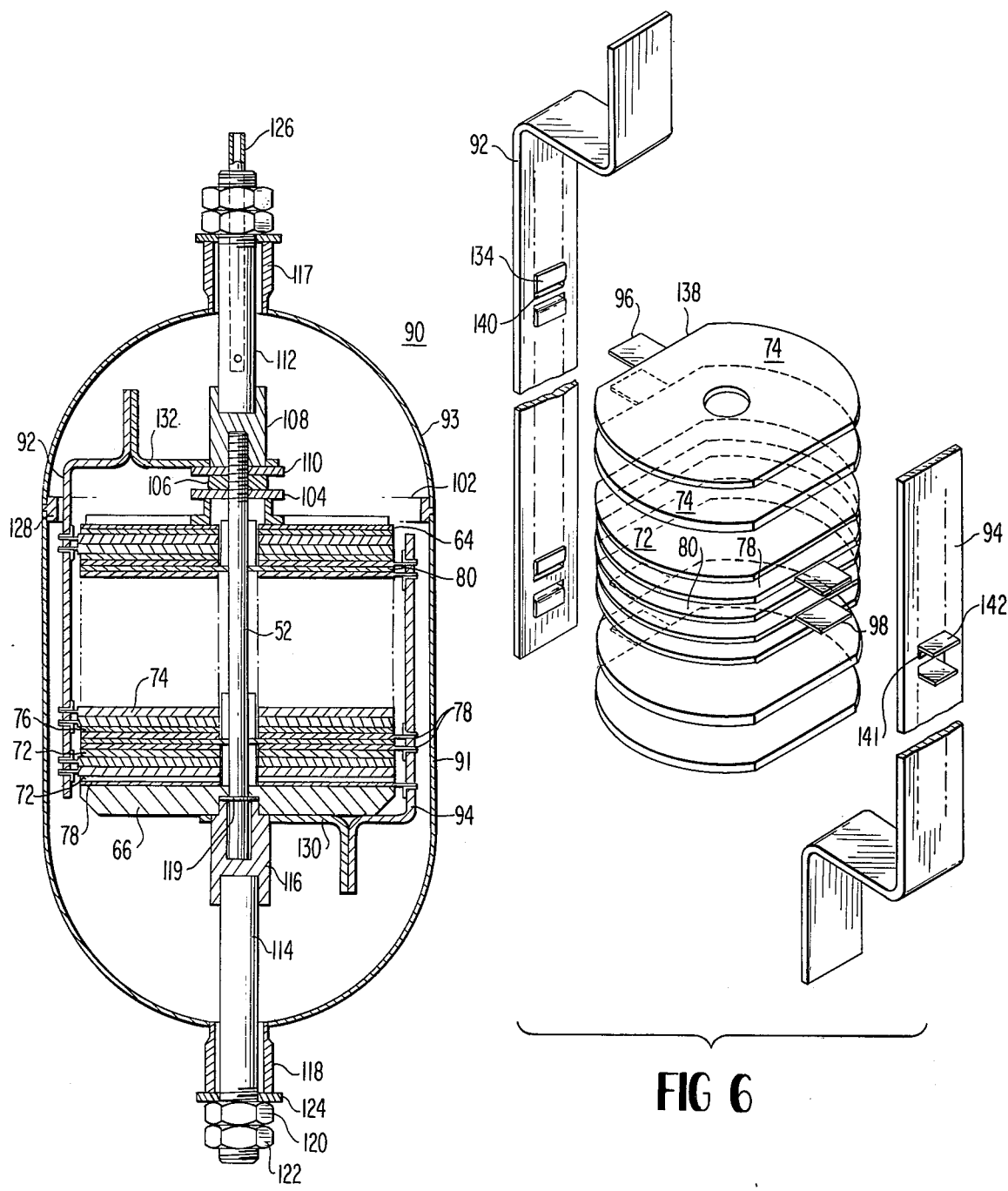
FIG. 5 is a cutaway side view of a second preferred embodiment showing a completed cell having a multi-electrode stack coupled in a parallel arrangement.
FIG. 6 is a schematic perspective of the cell tab and bus bar assembly of FIG. 5.

Referring now to FIGS. 5 and 6, a second preferred embodiment is shown. In FIG. 5 a schematic cross-section of an operational cell embodying all of the features of this invention is depicted. In this second preferred embodiment electrode connection is in parallel to provide an operative cell element. The output terminals of this cell can be coupled to other cells to define an operative power source. Elements common to the schematic shown in FIG. 4 will be designated by the same numerals. In FIG. 5, the pressure vessel 90 is generally made from two half shell sections. Those shell sections are fabricated by a hydroforming process starting with a sheet of Inconel 718 of approximately 20 mils. in thickness. During hydroforming, the longer half shell section 91 is drawn down in thickness to approximately 18 mils. while the shorter half shell section 93 remains close to the original thickness of 20 mils. Following hydroforming, these shells are age hardened by heat treatment in a vacuum furnace. As will be described herein, following assembly of the battery electrode stack components the two pressure shells 91 and 93 are welded to the weld ring to complete the pressure assembly shown as element 90.

As shown in FIG. 5, the electrode stack assembly is axially aligned on a rod 52. Washers or spacers 82 as used in the series construction are not required in this embodiment. Two back-to-back positive electrodes 74 are disposed on the stack and attached to positive bus bar 92 in a manner to be shown in detail in FIG. 6. By similar construction, negative electrodes 78 are disposed relative to the negative bus bar 94. Separators 72 and 76 are positioned in a manner identical to that shown in FIG. 4 and an individual module separator 80 is likewise disposed on the stack. Since electrode connection in this embodiment is in parallel, no electrolyte separation need be provided between adjacent modules. Therefore, a polypropylene (Vexar) screen is used for separator 80 between parallel connected adacent cells.

Assembly of the stack about rod 52 is as follows:

All positive electrodes 74 are weighed individually and sorted according to weight. These electrodes should weigh approximately 11.5 grams having a variation of no more than one half gram. These electrodes are then sorted into increments of 0.1 grams. Electrodes are then mixed together to make up multielectrode stacks matched to the weight average of the electrodes. These electrodes should naturally be visibly inspected and electrodes judged to have poor cosmetic appearance such as cracks, blisters, etc. should be rejected.

When assembling the stacks, a fixture can be used to line up electrode tabs shown as elements 96 for the positive electrodes and elements 98 for the negative electrodes. As will be seen herein, it is importance that these electrode tabs are maintained in an accurate alignment. Generally, aluminum rails can be used to facilitate this procedure. The top end plate 66 is placed face up on the bottom of the fixture with the center connecting rod 52 in place. A Vexar screen (not shown) is then placed next to the end plate as a separator element. This screen is approximately 25 mil thick Vexar polypropylene.

Then, in sequence a negative electrode is placed on the stack followed by an asbestos separator 72, back-to-back positive electrodes 74, another separator 72, a negative electrode 78, a Vexar screen 80, another electrode, and so on until the desired number of modules has been assembled.

When this has been accomplished, an weld ring 102 is placed over the end plate 64. An insulating washer 104 held in place by nut 106 is used to compress the stack in place. A sleeve 108 separated from the hex nut 106 by washer 110 is then used to mount the assembly in place relative to the positive support 112. A negative support 114 is also utilized in a similar manner utilizing sleeve 116.

Negative terminal 114 utilizes a coupling 118 to center the support 114 vis-a-vis the pressure shell 90. Two hex nuts 120 and 122 are used to provide a terminal coupling for an appropriate lead. A flat nylong washer 124 is used to provide an insulating space between the terminal hex nuts 120 and 122 on the support 114 via threads as shown in FIG. 5.

The positive terminal formed from support 112 is similar to that of negative terminal 114 with the exception that a fill tube 126 is shown coaxial for the purpose of adding electrolyte and hydrogen gas.

A unique feature of this assembly is the weld ring 102 having thereon a flange 128 extending from that ring. This weld ring is used for electron beam welding of the two pressure shells 91 and 93 and additionally to support the electrode stack assembly. As can be appreciated, while the electrode stack is held very rigid by the weld ring 102, both the positive and negative terminals are free to move or flux with the pressure vessel during cyclic operation.

A flange 119 in rod 52 is used to position the rod on sleeve 116. The rod is slightly reduced in diameter to have sliding contact with the sleeve 116. Hence, relative movement of the stack is facilitated. Additionally, not shown, a Teflon or plastic sleeve may be placed on the reduced section of the rod to provide insulation.

Referring now to FIG. 6, the details of the interconnection between the tab assembly for the individual cells and the bus bars is pictorially shown. The bus bars 92 and 94 perform the following functions. First, the provide a reliable means for electrically interconnecting the positive and negative electrodes. They also provide the technique for controlling electrode spacing throughout the stack. Finally, they provide structure for interconnecting these electrodes in a manner which can withstand the shock and vibration incurred in spacecraft launches.

As shown in FIG. 5 the bus bar 92 is welded into place by means of spacer 132 which couples the bus bar to element 108. In a similar fashion, bus bar 94 is positioned relative to spacer 116 by means of flange 130.

Referring to FIG. 6 grid spacers 134 are individually spot welded onto the bus bars to form individual slots for tabs 96 and 98. The grid spacers 184 are generally L-shaped each having a tab portion 142 for welding electrode tabs respectively to the bus bar. As the stack is built up, electrodes are placed between the bus bars and the tabs inserted into the slots provided. It is noted, that the electrodes are not full circles but have truncated portions 136 and 138 to facilitate entry into the stack and avoid inadvertent short circuiting. It is readily apparent, that the tabs 96 will fit into slots 140 on bus bar 92 and tabs 98 will fit into the slots 141 on bus bar 94. In a manner already described, the stack is then built up with the electrode tabs into the respective slots on their respective bus bars. When the stack has been assembled each electrode tab is welded in place to the tab portions 142 on the grid spacer provided. Excess tab material can be trimmed when the welding has been completed.

Final assembly will now be described. With the multielectrode stack assembled, it is inserted into the pressure vessel by sliding the negative terminal 114 through the plastic compression seal 118 of the pressure vessel shell section 91 until this shell is seated on the T-section 128 of the weld ring 102. The other section 93 of the pressure shell 90 is then added by sliding the positive terminal through its plastic compression seal 117 until that shell is also seated on the T-section of the weld ring at 128. Once alignment has been maintained final electron welding of the two pressure shells 91 and 93 to the welxring 102 is accomplished. Crimping of the compression seals 117 and 118 then takes place, performed in a press utilizing approximately 12 tons of pressure. During this procedure, the outside diameter is reduced from 0.5 to 0.472 inches.

The unit, once assembled can then be activated.

For a typical 35 amp/hr. NiH$_2$ cell, a proof test is first conducted by placing the cell in an explosion proof chamber. The cell is then pressurized to approximately 1,000 psig with helium. The pressure is slowly reduced to atmospheric level and the cell is removed from the explosion proof chamber. Next, a leak test is performed by installing a leak gauge and valve assembly to the unit. The cell is placed in a vacuum chamber with a leak detector attached to measure any helium that may leak from the cell. If the unit has a leak rate greater than $10^{-5}$ atm cc/sec. the unit is removed from the chamber. The nature of the leak is determined, repaired, and rechecked in a vacuum chamber.

Then, electrolyte loading can take place. The gauge and valve assembly are removed, and the unit is weighed. Evacuation of the cell of any air is done by connecting it to a vacuum line. Without introducing any air into the cell back filling with electrolyte takes place and the fill tube 126 is sealed with a swaglok cap. Electrolyte is, as indicated, loaded through fill tube 126. The cell is then allowed to soak for 24 hours and then weighed. The seal is then removed and the battery is charged at 3.5 A for 16 hours with hydrogen gas vented. Following this step, the cell is inverted to drain electrolyte while continuing the charging process. Weighing of the cell and expelled electrolyte then takes place and the pressure gauge and valve assembly are then installed. The cell is then pressurized with hydrogen to 100 psi and held while discharging from 17.5 A to 1.0 volts. The current is reduced to 5.0 amps and discharging is continued until 0.1 volts are reached.

Next, capacity measurements take place by installing the cells in temperature controlled equipment and adjusting the temperature to 68° ± 2° F. The cells are then pressurized to 100 psig and charged at 3.5 ± 0.2 amps for 22 hours. A record of cell voltage and pressure at half hour intervals is taken. The cells are then discharged at 17.5 amps ± 0.2 amps to 1.0 volts. The capacity of the cell should be at least 35 ahr. Maximum pressure is then adjusted by venting to 600 psi. Records of voltage and pressure are maintained until charge pressure and capacity are repeatable. Self discharge and charge retention tests are made, as conventionally known and once those tests have been completed the vent tube can be pinched and welded. The cell is then ready for actual operation by coupling to other units to form inoperative, composite power source.

Having described the preferred embodiment of this invention, it is readily apparent to those skilled in the art that various modifications and substitutions can be made without departing from the essential scope of this invention.

We claim:

1. In a rechargeable metal oxide-hydrogen battery with a number of modules, each module having an electrode stack with a pair of positive electrodes positioned directly adjacent each other, electrode separators disposed on open faces of the respective positive electrodes, a negative electrode having a hydrophobic surface and placed adjacent to each electrode separator and a module separator placed adjacent each negative electrode to separate negative electrodes of adjacent modules, the improvement comprising: the negative electrodes of one module electrically coupled to each other and to the positive electrodes of the succeeding adjacent module in the battery and the positive electrodes in said one module electrically coupled to each other and to the negative electrodes in the preceding module, wherein a series coupled high voltage battery is formed by successive couplings of adjacent modules.

2. The battery of claim 1 wherein each positive electrode comprises, a nickel-oxide element.

3. The battery of claim 2 wherein said positive electrodes comprises, a support and a plaque spread on said support comprising sintered nickel of porosity in the range of 78 to 85%.

4. The battery of claim 3 wherein the active reactant is nickel oxide and the loading level is in the range of 1.0 to 2.0 grams per cubic centimeter of the void volume in the plaque.

5. The battery of claim 1 wherein said electrode separators comprise an asbestos disc filled with KoH solution.

6. The battery of claim 1 wherein said electrode separators comprise a disc of potassium titanate in the range of 5-20 mils in thickness filled with KoH solution.

7. The battery of claim 5 wherein said asbestos disc is in the range of 5-20 mils in thickness and is of greater diameter than said electrodes.

8. The battery of claim 1 wherein said negative electrodes comprise a fine-mesh, nickel screen, a loading of teflon bonded platinum black on said screen and a teflon hydrophobic surface on one side of said screen.

9. The battery of claim 8 wherein the loading of platinum black is in the order of 3 mg/cm$^2$, and further including nickel tabs attached to said electrode.

10. The battery of claim 1 wherein said module separator comprises an inert hydrophobic disc formed from the group consisting of polytetrafluorethylene, polyethylene and polypropylene.

11. The battery of claim 10 wherein said cell separator has a gas transport layer on one surface thereof.

12. In a rechargeable metal oxide-hydrogen cell having a number of modules, each module having an electrode stack with a pair of positive electrodes positioned directly adjacent each other, electrode separators disposed on open faces of the respective positive electrodes, a negative electrode having a hydrophobic surface and placed adjacent to each electrode separator and a module separator placed adjacent each negative electrode to separate negative electrodes of adjacent modules, the improvement comprising: the negative electrodes in each module electrically coupled to each other by a first bus bar, a second bus bar electrically coupling the positive electrodes in each module to each other, a first terminal coupled to said first bus bar and a second terminal coupled to said second bus bar, whereby a parallel coupled cell is formed by said electrical couplings of said modules.

13. The cell of claim 12 wherein said cell is housed in a cylindrical pressure vessel in axial alignment with the cylindrical axis of said vessel said cell mounted in said vessel to facilitate movement relative to said terminals.

14. The cell of claim 13 wherein said electrodes are stacked on an axial rod, first and second compression plates on the respective ends of the stack and means to compress said stack between said compression plates.

15. The cell of claim 14 wherein said bus bars are disposed at the peripheral edge of said electrode stack, on opposite sides thereof, and wherein a flange electrically couples each bus bar to a respective terminal and said terminals are located at diametric ends of said vessel.

16. The cell of claim 13 wherein one of said terminals includes, a feed-through port for loading said pressure vessel, said feed-through port in axial alignment with said terminal.

17. The cell of claim 13 wherein said pressure vessel comprises two sections, a ring disposed on said electrode stack in axial alignment with said stack at a point where said sections of the pressure vessel meet where placed over said stack, and a flange for welding said ring and pressure vessel sections to each other.

18. The cell of claim 17 further including spaces in said ring to allow passage of bus bars, wherein said bus bars are not fixed to said pressure vessel.

19. The cell of claim 12 wherein each electrode has a tab, each tab operably connected to a respective bus bar.

20. The cell of claim 19 wherein each bus bar comprises, an elongate flange, a series of parallel notches in the flange, tab means connected to said flange and projecting through each notch, whereby said tabs on each electrode protrude through said notches in the same direction as said tab means and are welded to said tab means.

21. The cell of claim 20 wherein each electrode has a truncated portion and said tabs are located on the truncated portion of the electrode.

22. The cell of claim 21 wherein the thickness of said tabs is less than the thickness of said electrode.

* * * * *

UNITED STATES PATENT AND TRADEMARK OFFICE
CERTIFICATE OF CORRECTION

PATENT NO. : 4,115,630

DATED : September 19, 1978

INVENTOR(S) : Gerrit VAN OMMERING et al

It is certified that error appears in the above–identified patent and that said Letters Patent are hereby corrected as shown below:

Column 2, line 17 - delete "electroes" insert -- electrodes --

Column 8, line 18 - delete "adacent" insert -- adjacent -- line 33 - delete "importance" insert -- important -- line 47 - delete "an" insert -- a -- line 58 - delete "nylong" insert -- nylon --

Column 9, line 16 - after "First," delete "the" insert -- they -- line 58 - delete "welxring" insert -- weld ring --

Signed and Sealed this

Twenty-fourth Day of April 1979

[SEAL]

Attest:

RUTH C. MASON
Attesting Officer

DONALD W. BANNER
Commissioner of Patents and Trademarks